Sept. 24, 1968   R. S. LINT   3,402,802
RETRACTABLE ROLLER GUIDE ASSEMBLY
Filed April 7, 1967
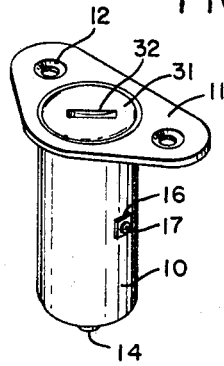
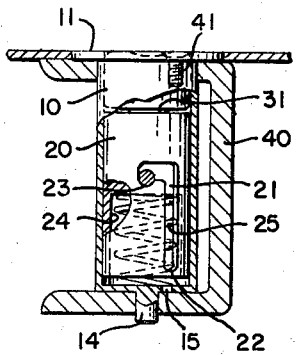
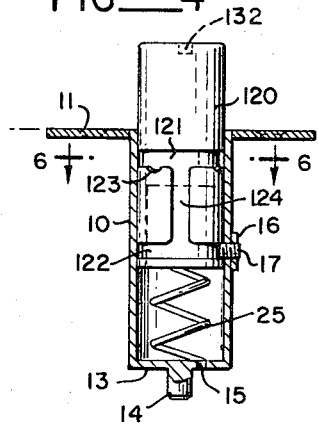
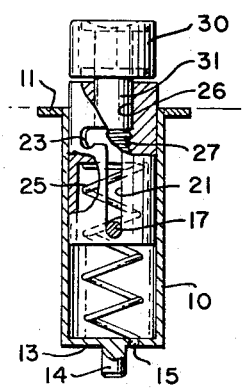
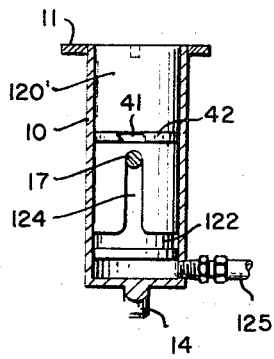
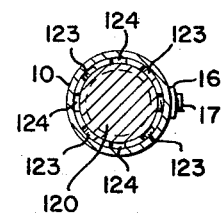
ROBERT S. LINT
INVENTOR.
BY
ATTORNEYS

United States Patent Office 3,402,802
Patented Sept. 24, 1968

3,402,802
RETRACTABLE ROLLER GUIDE ASSEMBLY
Robert S. Lint, 7800 Perimeter Road S.,
Seattle, Wash. 98108
Filed Apr. 7, 1967, Ser. No. 629,179
9 Claims. (Cl. 193—37)

ABSTRACT OF THE DISCLOSURE

A retractable roller guide assembly having a piston-roller urged by spring or air pressure upwardly from retracted position to an operative raised position wherein it is adapted to guide pallets or the like along a defined path. A set screw cooperates with grooves in the piston-roller to limit endwise movement thereof and to hold the piston-roller in retracted position when spring pressure is used to urge it into extended position; in the latter instance a partial turn releases the piston-roller.

Background of the invention

The present invention relates to a retractable roller assembly for guiding pallets, particularly in quick-change convertible cargo-passenger aircraft.

In such aircraft it is necessary to guide cargo pallets along a defined path in the aircraft during loading and unloading when the aircraft is used as a cargo carrier and to prevent shifting of the pallets during flight. On the other hand, when the aircraft is converted for passenger service a flush deck is needed free of protuberances. In view of this, and the fact that it is desired to reduce the conversion time to a minimum since it may well be a daily occurrence on some runs, the present invention aims to provide a roller unit for guiding pallets which can be retracted to the floor level or extended, and yet is of simple and economical construction, light in weight, reliable in operation, and easy to install, repair or remove.

Description of the drawings

FIG. 1 is a perspective view of a retractable roller assembly embodying the present invention and with the unit shown in retracted position;

FIG. 2 is an elevational view partly in vertical section and with parts broken away, illustrating a first embodiment of the invention mounted for operation;

FIG. 3 is an elevational view of the first embodiment partly in vertical section and with parts broken away, showing the plunger-roller assembly in raised position;

FIGS. 4 and 5 are views taken similarly to FIGS. 2 and 3 and showing a second embodiment in raised and retracted positions;

FIG. 6 is a transverse sectional view taken on line 6 of FIG. 4.

FIG. 7 shows a third embodiment in like manner as FIG. 5.

Referring to the drawings, in the first illustrated embodiment a cylindrical housing 10, open at the top, is provided with an upper anchoring flange 11 formed with bolt holes 12, and is closed at the bottom by a base plug 13. This plug has a depending anchor pin 14 and a vent hole 15. Approximately midway of its ends the housing 10 may be reinforced by a boss piece 16 which together with underlying portion of the housing is tapped to receive a set screw 17.

Slidably mounted in the housing 10 is a plunger 20 formed with a bayonet slot 21 cooperating with the screw 17. This slot extends upwardly from a stop shoulder 22 through a major part of the length of the plunger and then L's circumferentially to a detent 23. Through part of its length the slot 21 intersects a bottom cylindrical chamber 24 for housing a compression spring 25. A center bore 26 of reduced diameter continues from the top of this chamber 24 to the top of the plunger and has its lower portion threaded at 27.

Mounted atop the plunger 20 is a roller 30 journaled as by needle bearings on a stem 31 which extends through the bore 26 and is threaded along its free end portion in correspondence with the threads 27. The stem 31 is either permanently anchored to the plunger by a suitable adhesive applied to the threads, or is made removable by extending it into the chamber 24 and applying a nut (not shown) located within the upper end of the spring 25. At its upper end the stem 31 has an enlarged head which is slotted at 32 to receive a tool for turning the plunger 20 in the housing 10. A Torrington CRS–16 cam follower may be used as the roller unit.

As shown in FIG. 2, the housing 10 is adapted to be suspended by its anchoring flange 11 from the upper flange of a structural channel 40 in an aircraft. This upper flange is bored to provide mating holes for the bolt holes 12 to receive suitable anchor bolts 41, and to provide an opening accommodating the housing 10. The lower flange of the channel 40 is bored in proper alignment to provide a mating hole for the anchor pin 14. By this arrangement the pin 14 in cooperation with the bolts 41 resist cocking or other displacement of the housing 10 relative to the channel 40 responsive to lateral thrust of a pallet against the roller 30.

When the roller assembly is in extended pallet-guiding position (FIG. 3), the roller 30 is projected above the floor level by action of the spring 25 while the plunger 20 is retained in its housing by engagement of the stop shoulder 22 with the screw 17. To retract the roller assembly, manual pressure is applied on the upper end of the stem 31 in opposition to the spring 25 until the top of the bayonet slot 21 engages the screw 17 and then the plunger 20 is turned counter-clockwise as viewed from the top until the detent 23 is directly beneath the screw 17, whereupon the plunger is released to lock the roller assembly in retracted position. When the aircraft is again converted for cargo use, the plunger is extended merely by applying downward turning pressure on the stem 31 to lower the detent 23 from the screw 17 and aline the vertical portion of the slot 21 with the screw and then releasing the stem to extend the plunger action of the spring 25.

In the second embodiment of the invention, shown in FIG. 4, the plunger is modified to also directly assume the roller function while the housing 10 remains the same. The modified plunger, designated 120, still has a bottom chamber 24 for the compression spring 25, but is closed above and is elongated in correspondence with the height of the roller 30. Its upper face is formed with a slot 132 to receive a turning tool. The stroke of the plunger is defined by the spacing between a pair of annular grooves 121–122 interconnected by one or more vertical grooves 124 to receive the bayonet screw 17.

By this second arrangement when the plunger 120 is extended upwardly in operative position (FIG. 4), the screw 17 occupies the lower groove 122 and the plunger is free to bodily turn relative to the housing and screw responsive to engagement of the top of the plunger by a pallet. During such turning, the plunger also either turns relative to the spring 25, or the spring turns with the plunger in the housing. When it is desired to retract the plunger, it is turned until one of its vertical grooves 124 reaches the bayonet screw 17 and is then manually pressed downward until the top of the upper groove 121 bears against the screw. Finally, the plunger is turned a partial revolution and released to bottom the upper groove against the screw 17. It is preferred to provide detents 123 on the bottom of the upper groove 121 between the vertical grooves 124 to respectively seat the screw 17 so as to yieldingly resist unwanted dislodgment of the plunger from its retracted position. When it is desired to extend the plunger, it is pressed downwardly to free the screw 17 from the related detent 123, and then is turned until one of the vertical grooves 124 is alined with the screw whereupon the plunger is free to rise into extended operative position.

As a further embodiment of the invention, the spring 25 and vent 15 are eliminated, and a combination supply-vent pipe 125 is connected to the lower end of the housing 10. This pipe 125 feeds from a manifold common to a row or group of the roller guide assemblies so that when the manifold is charged with pressure air the plungers of the related assemblies will simultaneously pop up. To maintain an adequate seal for this function, to be performed each plunger is circumferentially grooved at 41 and fitted with a piston ring 42 or suitable O-ring providing not only the seal but also sufficient friction with the inside wall of the housing 10 to keep the plunger extended after the air pressure is relieved. With the manifold vented, each plunger can be readily retracted for conversion to passenger service by stepping on them.

FIG. 5 illustrates the second embodiment converted to air operation. It will be noted that the only modification in the plunger, identified at 120′, other than making provision for the piston ring 42, is the elimination of the upper annular groove 121. Similarly, to convert the first embodiment to air operation the bayonet slot 21 is modified to a straight vertical guide slot.

The retractable roller guide assemblies of the present invention are installed in the described manner at regular intervals along the sides of a predetermined travel path in the aircraft. They thus define an aisle for the controlled travel of pallets loaded into the aircraft. Further, after the loaded pallets have been tied down, the roller guide assemblies assist in preventing lateral shifting of the pallets while the aircraft is underway.

It is believed that the invention will have been clearly understood from the foregoing detailed description of my now-preferred illustrated embodiment. Changes in the details of construction may be resorted to without departing from the spirit of the invention.

What I claim is:

1. A retractable roller guide assembly comprising, a housing with an elongated chamber of circular cross-section open at the top, means for anchoring said housing, a plunger slidably and turnably mounted in said chamber, a stem projecting upwardly from the center of said plunger, a roller journaled on said stem and having about the same diameter as that of the plunger, compression spring means in the chamber beneath the plunger for urging the plunger and roller upwardly from a lowered storage position in the housing to an extended position in which the roller is raised above the housing, an external longitudinal groove in said plunger having its lower end portion always below the top of said chamber, said groove having an upper extension extending circumferentially of the plunger, a set screw having its head exposed to the outside of said housing and projecting by its other end radially into said groove to limit upward travel of the plunger and also to hold the plunger and roller retracted in said storage position when the set screw occupies said upper extension of the groove, an exposed depression in the top of said stem adapted to receive a tool for turning the plunger relative to said set screw, and means for venting the chamber below the plunger.

2. A retractable roller guide assembly comprising, a housing with an elongated chamber of circular cross-section open at the top, means for anchoring said housing comprising a laterally extending flange at the top of the housing and a pin projecting downwardly from the bottom of the housing, roller means journaled to turn about the longitudinal center axis of said chamber and slidably mounted in said housing for extension into an operative raised position projected above the housing and for retraction into a lowered storage position within the housing, a longitudinal groove in the roller means exposed to the side wall of the chamber and having its lower end portion always below the top of said chamber, a set screw having its head exposed to the outside of said housing and projecting by its other end radially into said groove to limit upward travel of the roller means, means within said chamber for raising said roller means, means within said chamber for holding the roller means in extended position, and means for venting the chamber below the roller means so that the roller means may be lowered into storage position.

3. A retractable roller guide assembly according to claim 1 in which said groove is part of a bayonet slot of inverted L configuration, and said means for raising the roller means and for holding it in extended position comprises a compression spring in the chamber beneath the roller means.

4. A retractable roller guide assembly according to claim 3 in which the top of the roller means has a depression adapted to receive a tool to turn the upper part of said slot relative to said set screw.

5. A retractable roller guide assembly according to claim 1 in which said roller means comprises a plunger with said groove and with an axial bore, a stem projecting upwardly from said bore and anchored to the plunger, and a roller above the plunger and journaled on said stem, said roller having substantially the same diameter as the outside diameter of the plunger.

6. A retractable roller guide assembly comprising, a housing with an elongated chamber of circular cross-section open at the top, means for anchoring said housing, a plunger journaled in said chamber to turn about the longitudinal center axis of the chamber and slidably mounted in said chamber for extension into an operative raised position projected above the housing and for retraction into a lowered storage position within the housing, a longitudinal groove in the plunger exposed to the side wall of the chamber and having its lower end portion always below the top of said chamber, a lower annular groove in said plunger intersected by the lower end of said longitudinal groove, a set screw having its head exposed to the outside of said housing and projecting by its other end radially into said longitudinal groove when said plunger is in said storage position and into said lower annular groove when said plunger is in said raised position to limit upward travel of the plunger and yet permit rotation of the plunger when in such raised position, means within said chamber for raising said plunger, means within said chamber for holding the plunger in extended position, and means for venting the chamber below the plunger so that the plunger may be lowered into storage position.

7. A retractable roller guide assembly according to claim 6 in which said longitudinal groove intersects at the top an upper annular groove in the plunger, and said means for raising the plunger and for holding it in extended position comprises a compression spring in the chamber beneath the plunger.

8. A retractable roller guide assembly according to claim 7 in which said upper annular groove has a bottom detent.

9. A retractable roller guide assembly according to claim 7 in which said means for raising the plunger comprises a supply of pressurized fluid to the chamber beneath the plunger, and said means for holding the plunger in extended position comprises a piston ring on the plunger.

References Cited

UNITED STATES PATENTS

| | | | |
|---|---|---|---|
| 935,669 | 10/1909 | Logan | 193—35 |
| 2,617,509 | 11/1952 | Britton | 193—35 |
| 3,176,828 | 4/1965 | Sullivan | 193—35 |

EVON C. BLUNK, *Primary Examiner.*

M. L. AJEMAN, *Assistant Examiner.*